United States Patent [19]

Petri

[11] Patent Number: 4,920,198

[45] Date of Patent: Apr. 24, 1990

[54] BRANCHED POLYCARBONATE FROM HYDROXY-NAPHTHOIC ACID OR DERIVATIVE, AND PROCESS FOR PREPARING

[75] Inventor: Alberto Petri, Milan, Italy

[73] Assignee: Enichem Tecnoresine S.p.A., Palermo, Italy

[21] Appl. No.: 203,425

[22] Filed: Jun. 7, 1988

[30] Foreign Application Priority Data

Jun. 17, 1987 [IT] Italy ................................ 20929 A/87

[51] Int. Cl.$^5$ .............................................. C08G 63/62
[52] U.S. Cl. .................................... 528/201; 528/198; 528/199; 528/204
[58] Field of Search ................ 528/201, 198, 199, 204

[56] References Cited

U.S. PATENT DOCUMENTS 3,996,197 12/1976 Binsack ................................ 528/201
4,789,723 12/1988 Manaresi et al. .................... 528/201

Primary Examiner—Harold D. Anderson
Attorney, Agent, or Firm—Hedman, Gibson, Costigan & Hoare

[57] ABSTRACT

Branched, thermoplastic polycarbonates, suitable for being processed according to the blow-molding technique, are prepared by copolymerization with hydroxynaphthoic acids or their derivatives.

4 Claims, No Drawings

BRANCHED POLYCARBONATE FROM HYDROXY-NAPHTHOIC ACID OR DERIVATIVE, AND PROCESS FOR PREPARING

The present invention relates to branched, thermoplastic carbonates, suitable for fabrication by blow-molding (blow molding of hollow bodies).

Linear polycarbonates have been long known in the art.

Such polymers are largely used in many application sectors, but unlike to most thermoplastic polymers, they are not suitable for being processed by extrusion or by the blow-molding technique, which are the suitable techniques for manufacturing particular fabricated products (alveolar sheets, bottles, hollow containers, and so forth).

This difficulty in processing linear polycarbonate is due to its exclusively Newtonian behaviour, according to which the apparent viscosity ($\eta$) is substantially independent from the shear rate ($\dot{v}$).

On the contrary, the fabrication of a material according to the extrusion or blow-molding techniques requires that it has a decreasing apparent viscosity with increasing shear rates, a typical feature of non-Newtonian behaviour, so that two successive statuses can be differentiated in the molten polymer: a first status, when the polymer is inside the processing machine (e.g., an extruder), and the other one when the product exits it (e.g., through the die of the same extruder).

During the first step, the shear rates the fluid is submitted to are high and its apparent viscosity is low, so that the processing of said molten polymer is easier; when the polymer leaves the extruder, on the contrary, low values of $\dot{v}$ and high viscosity values are obtained, which prevent the product from collapsing, and enable the manufactured item to be endowed with a good dimensional stability.

The non-Newtonian behaviour of the molten polymer has a considerable influence on two properties thereof, viz., the melt elasticity and the melt strength, which are very important as well for the purposes of the extrusion and blow-molding processing techniques.

The melt elasticity substantially consists in the capability shown by a non-Newtonian fluid, of swelling, when exiting a die, to a greater extent than a Newtonian fluid, as a consequence of a higher recovery of elastic energy inside the interior of its mass, thanks to a greater molecular distortion and orientation under the action of a shear stress.

All the above phenomena result in an increase in product processability, owing to a higher flexibility and ductility of the material.

Vice-versa, the second above-indicated property, the melt strength, becomes meaningful when the molten material exits the fabrication machine. Said melt strength can be regarded as the tenacity of the polymer in the molten state, i.e., the capability exhibited by this latter to withstand stresses.

If, in fact, the molten mass does not succeed in supporting its own weight, the extrudate collapses and, as a consequence, the desired shapes cannot be obtained in the manufactured articles.

It is evident from the above that the polymers with a non-Newtonian behaviour exhibit two basic characteristics, which make them suitable for being fabricated by extrusion and/or blow-molding: ease in machine-processing (a low apparent viscosity for high values of $\dot{v}$ and a high melt elasticity) and a very good dimensional stability when leaving the machine (a high melt viscosity for low values of $\dot{v}$ and a considerably high melt strength).

From the prior art, branched polycarbonates are known, which are endowed with non-Newtonian rheologic properties, and are suitable for being fabricated by extrusion and blow-molding.

Such polycarbonates can be obtained by copolymerization with polyfunctional comonomers containing three or more —OH and/or —COOH and/or —COCl groups.

The main technical problems to be coped with when branched polycarbonates are prepared, essentially derive from the poor reactivity of the polyfunctional comonomer used, due to the fact that not all functional groups react to a complete, or practically complete, extent.

Therefore, the so-obtained polycarbonates display a lower branching degree then as desired, and their preparation requires a large comonomer consumption.

The present Applicant has found now that the drawbacks of the prior art can be overcome, if a comonomer is used, which has three or more functional groups which all react to a complete, or practically complete, extent under the condition of use.

The branched polycarbonates obtained by using such a comonomer show a shear sensitivity (which is the ratio between the melt flow rate values at two different shear rates) of more than 15, while simultaneously maintaining the other characteristics typical for linear polycarbonates.

Therefore, a purpose of the present invention are branched, thermoplastic polycarbonates suitable for fabrication by blow-moulding.

A purpose of the present invention is also a process for preparing said polycarbonates.

In particular, according to the present invention, such branched polycarbonates are characterized in that they have in their macromolecule, units deriving from hydroxy-naphthoic acids or their derivatives having the formula:

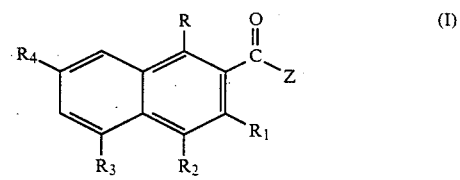

wherein:
Z means OH or Cl;
R, $R_1$, $R_2$, $R_3$, $R_4$, either equal to, or different from, one another, mean H, OH, alkyl groups containing from 1 to 4 carbon atoms, and at least two thereof are OH.

The branched polycarbonates disclosed in the present invention can be prepared by means of a process which comprises the following steps, carried out successively:

(a) preparation of a chloroformyl-terminated oligomer, by reaction of phosgene and a dihydroxy-aromatic compound having the formula:

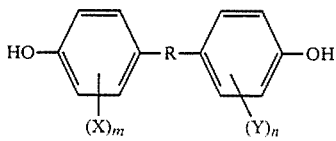

(II)

wherein:
R = an either substituted or non-substituted alkyl radical, containing from 0 to 5 C atoms, —O—, —S—, —SO—, —CO—;
X, Y are equal to, or different from, each other, and represent: H, CH$_3$, halogen;
m, n are integers, either equal to, or different from, each other, comprised within the range of from 1 to 4;

(b) condensation of the so-obtained oligomer with the polyfunctional comonomer of formula (I), wherein R, R$_1$, R$_2$, R$_3$, R$_4$ and Z have the above seen meaning;

(c) addition of a dihydroxy-aromatic compound (II) to the mixture obtained from (b), and polycondensation;

(d) recovery of the branched polycarbonate from the reaction mixture.

According to the present invention, the chloroformyl-terminated oligomers are prepared by means of the interface reaction between phosgene and a dihydroxy-aromatic compound (II) dissolved in an aqueous-alkaline solution, in the presence of an organic solvent immiscible with water, and of a molecular weight regulator, such as, e.g., p-tert.-butylphenol or p-isopropylphenol.

As the dihydroxy-aromatic compounds, for example, the following can be used:
4,4'-dihydroxy-biphenyl;
2,2-bis(4-hydroxy-phenyl)propane (Bisphenol A);
2,2-bis(3,5-dichloro-4-hydroxy-phenyl)propane;
bis(4-hydroxy-phenyl)methane;
2,2 -bis(3,5-dimethyl-4-hydroxy-phenyl)propane.

Also bivalent compounds with one aromatic ring only, such as resorcinol or hydroquinone, can be used.

The reaction is carried out at a temperature comprised within the range of from 15° C. to 35° C., and preferably at room temperature (20°–25° C.).

The so-obtained oligomers have a molecular weight comprised within the range of from 400 to 2,000.

After the phase separation, to the organic phase containing the chloroformyl-terminated oligomers, the solution of the polyfunctional comonomer (I) in an organic solvent immiscible with water is added, with the amount of comonomer being such as to make it possible an end polycarbonate containing at least 0.01 mol of comonomer, and preferably from 0.1 to 2.0 mol of comonomer per each 100 mol of aromatic dihydroxy-compound (II) to be obtained.

Organic solvents immiscible with water are selected from those known from the prior art, and methylene chloride is preferably used.

Some examples of polyfunctional comonomers used are:
3,5-dihydroxy-2-naphthoic acid;
3,7-dihydroxy-2-naphthoic acid;
1,4-dihydroxy-2-naphthoic acid;
3,5-dihydroxy-2-chlorocarbonyl-naphthalene;
3,7-dihydroxy-2-chlorocarbonyl-naphthalene;
1,4-dihydroxy-2-chlorocarbonyl-naphthalene.

Said comonomers can be obtained according to processes known in the art, and most of them can be easily found on the market. If the commercial products are used, they have to be carefully purified before being used according to the purposes of the present invention.

After the addition of the solution containing the comonomer (I), the reaction is continued by adding an aqueous-alkaline solution containing a reducing agent, preferably sodium dithionite, in order to prevent coloured by-products from forming, and then an aqueous solution is added, which contains the phase-transfer catalyst, e.g., a tertiary amine, preferably triethylamine.

The temperature at which the condensation is carried out is comprised within the range of from 15° C. to 35° C., and is preferably kept at values around room temperature (20°–25° C.)

After a time period ranging from 30 to 60 minutes, and preferably of 40 minutes, the biphasic system deriving from the condensation with the polyfunctional comonomer is treated with an alkaline solution of the aromatic dihydroxy-derivative.

An aqueous-alkaline solution of sodium hydroxide at 20% by weight is then added.

After a time of from 2 to 3 hours, the so-obtained branched polycarbonate is isolated by washing the organic phase according to the methods known in the art, and distillation of the solvent, or precipitation with a non-solvent.

The preparation of such branched polycarbonates can be also carried out according to other processes, such as, e.g., the process according to which aromatic dihydroxy-derivatives, phosgene and the polyfunctional comonomer are condensed by means of an interface reaction, or in solution, by means of a single-step reaction.

Such polycarbonates can be also obtained by transesterification in the molten state, with the dihydroxy-aromatic compound being reacted with diaryl-, dialkyl- or alkylaryl-carbonates at temperatures comprised within the range of from 100° to 300° C., in the presence of transesterification catalysts.

The branched polycarbonates of the present invention have a molecular weight comprised within the range of from 20,000 to 30,000, and are characterized in that they are completely soluble in the usual solvents for linear polycarbonate, and in that their melt-viscosity is strongly dependent on the shear rate.

Such branched polycarbonates are therefore suitable for being processed both by the injection-moulding technique, and for example by extrusion.

Owing to the excellent stability of their molten mass, such polycarbonates are particularly suitable for being fabricated by means of the blow-molding method, in order to produce hollow bodies.

The reactivity of the polyfunctional comonomer used as the branching agent is such that amounts of at least 0.01 mol, and preferably comprised within the range of from 0.1 to 2.0 mol of such comonomer per each 100 mol of aromatic dihydroxy-compound are enough for reaching such a crosslinking degree, that the shear-sensitivity has values always higher than 15.

In order to characterize the branched polycarbonates according to the present invention, the following methods were used:

Intrinsic viscosity-Is determined in methylene chloride at 20° C. by means of the Ubbelhode viscometer, and is expressed as dl/g.

Shear sensitivity-The evaluation of this quantity is carried out by using the melt indexer, under loads of 2.16 and 21.6 kg at 260° C., according to ASTM D 1238.

Impact strength (IZOD)-Is evaluated on notched specimens at 0° C., according to ASTM D 256.

The following examples are illustrative, and non-limitative of the same invention.

EXAMPLE 1

Purification of 3,7-dihydroxy-2-naphthoic acid 3.5 g of commercial 3,7-dihydroxy-2-naphthoic acid (purity level=86%, computed by indirect acidimetric titration) is dissolved in 40 ml of an aqueous solution of $Na_2S_2O_4$ at 0.1% by weight.

To such solution, beforehand 1.4 g of $Na_2CO_3$ and then 20 ml of methyl-isobutyl-ketone are added, under a nitrogen stream and with mechanical stirring.

The so-obtained mixture is then heated at 40° C. for a 3-hour time.

At the end of this time period, the mixture is allowed to return back to room temperature (20°-25° C.), and the aqueous phase is separated and is then acidified with $H_2SO_4$ at 30% by weight, until a pH value=2 is reached.

The precipitated product is filtered off, the filter panel is washed many times with water portions of 500 ml, and is finally dried under vacuum.

The obtained product is dissolved again in an aqueous solution of $Na_2S_2O_4$ at 0.1%, and is treated again as previously disclosed.

The end product obtained is a 3,7-dihydroxy-2-naphthoic acid having a purity level equal to, or higher than, 99%.

The elemental analysis thereof supplies the following data:
C=59.5% (theoretical: 59.4%);
H=3.3% (theoretical: 3.2%).

EXAMPLE 2

To a glass reactor of 3 liters of capacity, maintained at the controlled temperature of 25° C., under nitrogen 84 g of bisphenol A, 300 mg of 3,7-dihydroxy-2-naphthoic acid (equivalent to 0.4 mol % relatively to bisphenol A), 65.2 g of sodium hydroxide dissolved in 650 ml of water, 20 mg of sodium dithionite (as a reducing agent) and 6.3 ml of a 0.5N aqueous solution of trimethylamine are charged.

2.7 g of p-tert.-butylphenol dissolved in 1,300 ml of methylene chloride is then added, and into the mixture, maintained with vigorous stirring, 44 g of phosgene gas bubbled over 30 minutes. The reaction is proceeded for 2 hours, with aqueous sodium hydroxide at 20% by weight being added, in order to keep pH value higher than 11.

At the end, the reaction mixture is diluted with 500 ml of methylene chloride, and the organic phase is separated and washed, in the order, with 300 ml of water (twice), 800 ml of 0.15N aqueous sodium hydroxide (three times), 600 ml of water (twice), 800 ml of 0.1N hydrochloric acid, and finally with portions of 600 ml of water until neutral.

At the end, the polymer is recovered by distilling off the organic solvent, is dried and ground until a powder is obtained.

The branched polycarbonate obtained shows the following characteristics:
Intrinsic viscosity=0.510 dl/g;
Shear sensitivity=21.2
IZOD impact strength=771 J/m

EXAMPLE 3

The process is carried out with the same operating modalities as of Example 2, except for that instead of 3,7-dihydroxy-2-naphthoic acid, 300 mg of 3,5-dihydroxy-2-naphthoic acid (0.4 mol % relatively to total bisphenol A) is used.

The branched polycarbonate obtained has the following characteristics:
intrinsic viscosity=0.512 dl/g
shear sensitivity=23.3
IZOD impact resistance=802 J/m

EXAMPLE 4

226 g of chloroformyl-terminated polycarbonate oligomers (number average molecular weight=722; chloroformyl end groups=2,611 meq/kg; hydroxy end groups=160 meq/kg), prepared from bisphenol-A, phosgene and p-tert.-butylphenol, is dissolved in 900 ml of methylene chloride containing 3.53 g of 3,7-dihydroxy-2-chlorocarbonyl-naphthalene (1.55 mol % relatively to bisphenol A), and is charged, under nitrogen stream, to a glass reactor of 2.5 liters of capacity, maintained at the controlled temperature of 25° C.

While the above solution is maintained with mechanical stirring by means of a double-anchor stirrer (300 rpm), to it a solution of 350 ml of water containing 52.1 g of bisphenol A, 21.5 g of sodium hydroxide, 31 mg of sodium dithionite, and 5 ml of an 0.05N aqueous solution of triethylamine are added in the same order as stated.

Subsequently, 92 ml of an aqueous solution of sodium hydroxide at 20% by weight is charged over 10 minutes, by means of a metering pump.

After 3 hours, the mixture is poured into 2,200 ml of methylene chloride; the organic phase is then separated and washed, in the same order as stated, with 450 ml of water (twice), 1,300 ml of 0.15N aqueous sodium hydroxide (three times), 900 ml of water (twice), 1,300 ml of 0.1N hydrochloric acid and, finally, with portions of 900 ml of water up to neutral pH value.

The branched polycarbonate, isolated by means of the usual methodology, shows the following characteristics:
intrinsic viscosity=0.499 dl/g;
shear sensitivity=20.3
IZOD impact strength=725 J/m

EXAMPLE 5

226 g of chloroformyl-terminated polycarbonate oligomers (number average molecular weight 722; chloroformyl end groups=2,611 meq/kg; hydroxy end groups=160 meq/kg), prepared from bisphenol-A, phosgene and p-tert.-butylphenol, is dissolved in 900 ml of methylene chloride and is charged, under nitrogen, to a glass reactor of 2.5 liters of capacity, kept at the controlled temperature of 25° C.

While the above solution is maintained with mechanical stirring by means of a double-anchor stirrer (300 rpm), to it 50 ml of water containing 810 mg of 3,7-dihydroxy-2-naphthoic acid (0.38 mol % relatively to total bisphenol A), 1.8 g of sodium hydroxide, 31 mg of sodium dithionite, and 5 ml of a 0.05N aqueous solution of triethylamine are added in the same order as stated.

40 minutes later, 300 ml of water containing 55.8 g of bisphenol A and 19.7 g of sodium hydroxide and, then, over 10 minutes, 92 ml of an aqueous solution of sodium hydroxide at 20% by weight are charged by means of a metering pump.

After 3 hours, the mixture is poured into 2,200 ml of methylene chloride; the organic phase is then separated and washed, in the same order as stated, with 450 ml of water (twice), 1,300 ml of 0.15N aqueous sodium hydroxide (three times), 900 ml of water (twice), 1,300 ml of 0.1N hydrochloric acid and, finally, with portions of 900 ml of water up to neutral pH value.

The branched polycarbonate, isolated by means of the usual methodology, shows the following characteristics:
intrinsic viscosity=0.487 dl/g;
shear sensitivity=18.0
IZOD impact strength=735 J/m

EXAMPLE 6

The process is carried out with the same operating modalities and amounts of reactants as of Example 5, except for that 1.62 g of 3,7-dihydroxy-2-naphthoic acid (0.77 mol % relatively to total bisphenol A) is used.

The branched polycarbonate obtained has the following characteristics:
intrinsic viscosity=0.538 dl/g
shear sensitivity=22.2
IZOD impact resistance=790 J/m

EXAMPLE 7

The process is carried out with the same operating modalities and amounts of reactants as of Example 5, except for that the amount of 3,7-dihydroxy-2-naphthoic acid used is of 2.43 g (1.13 mol % relatively to total bisphenol A).

The branched polycarbonate obtained has the following characteristics:
intrinsic viscosity=0.589 dl/g
shear sensitivity=27.5
IZOD impact resistance=810 J/m

EXAMPLE 8

The process is carried out with the same operating modalities and amounts of reactants as of Example 5, except for that instead of 3,7-dihydroxy-2-naphthoic acid, 740 mg of 1,4-dihydroxy-2-naphthoic acid (0.35 mol relatively to total bisphenol A) is used.

The branched polycarbonate obtained has the following characteristics:
intrinsic viscosity=0.474 dl/g
shear sensitivity=16.8
IZOD impact resistance=757 J/m

EXAMPLE 9

The process is carried out with the same operating modalities and amounts of reactants as of Example 5, except for that instead of 3,7-dihydroxy-2-naphthoic acid, 1.49 g of 1,4-dihydroxy-2-naphthoic acid (0.71 mol % relatively to total bisphenol A) is used.

The branched polycarbonate obtained has the following characteristics:
intrinsic viscosity=0.509 dl/g
shear sensitivity=18.1
IZOD impact resistance=780 J/m

EXAMPLE 10

The process is carried out with the same working conditions and amounts of reactants as in Example 5, with the exception that the 3,7-dihydroxy-2-naphthoic acid is replaced by 750 mg of 3,5-dihydroxy-2-naphthoic acid (0.35 mol % relative to the total bisphenol A).

The branched polycarbonate obtained has the following characteristics:
intrinsic viscosity=0.496 dl/g
shear sensitivity=20.2
IZOD impact resistance=794 J/m

EXAMPLE 11

The process is carried out with the same working conditions and amounts of reactants as of Example 5, except for that instead of, 3,7-dihydroxy-2-naphthoic acid, 1.51g of 3,5-dihydroxy-2-naphthoic acid (0.72 mol % relatively to total bisphenol A) is used.

The branched polycarbonate obtained has the following characteristics:
intrinsic viscosity=0.523 dl/g
shear sensitivity=25.3
IZOD impact resistance=807 J/m

I claim:

1. A blow moldable branched polycarbonate comprising units derived from phosgene, at least one aromatic dihydroxy-compound and a hydroxy-naphthoic acid compound having the formula:

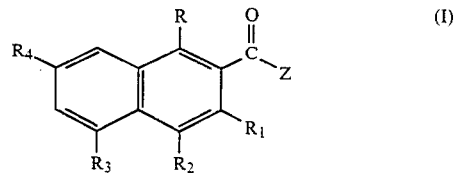

wherein:
Z represents OH or Cl;
$R$, $R_1$, $R_2$, $R_3$, and $R_4$, are the same or different from one another, and represent H, OH, alkyl groups containing from 1 to 4 carbon atoms, and at least two thereof are OH.

2. The branched polycarbonate according to claim 1, wherein the hydroxy-naphthoic acid compound is selected from the group consisting of:
   (a) 3,5-dihydroxy-2-naphthoic acid;
   (b) 3,7-dihydroxy-2-naphthoic acid;
   (c) 1,4-dihydroxy-2-naphthoic acid;
   (d) 3,5-dihydroxy-2-chlorocarbonyl-naphthalene;
   (e) 3,7-dihydroxy-2-chlorocarbonyl-naphthalene; and
   (f) 1,4-dihydroxy-2-chlorocarbonyl-naphthalene.

3. The branched polycarbonate according to claim 1, wherein the hydroxy-naphthoic compound is present in a ratio of from at least 0.01 mol of the hydroxy-naphthoic acid compound per each 100 mol of the aromatic dihydroxy-compound.

4. The branched polycarbonate according to claim 3, wherein the hydroxy-naphthoic compound is presented in a ratio of from 0.1 to 2.0 mol of the hydroxy-naphthoic acid compound per each 100 mol of the aromatic dihydroxy-compound.

* * * * *